(12) United States Patent
Lasseter et al.

(10) Patent No.: US 7,521,825 B2
(45) Date of Patent: Apr. 21, 2009

(54) INTERFACE SWITCH FOR DISTRIBUTED ENERGY RESOURCES

(75) Inventors: Robert H. Lasseter, Madison, WI (US); Paolo Piagi, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 389 days.

(21) Appl. No.: 11/266,976

(22) Filed: Nov. 4, 2005

(65) Prior Publication Data

US 2007/0129110 A1 Jun. 7, 2007

(51) Int. Cl.
*H01H 47/00* (2006.01)
*H02B 1/24* (2006.01)

(52) U.S. Cl. ............... 307/130; 307/126; 307/127; 307/129

(58) Field of Classification Search .......... 307/126, 307/127, 129, 130
See application file for complete search history.

(56) References Cited

U.S. PATENT DOCUMENTS

| | | | |
|---|---|---|---|
| 5,041,959 A | 8/1991 | Walker | |
| 5,329,222 A | 7/1994 | Gyugyi et al. | |
| 5,596,492 A | 1/1997 | Divan et al. | |
| 5,614,770 A | 3/1997 | Suelzle | |
| 5,745,356 A | 4/1998 | Tassitino, Jr. et al. | |
| 6,111,764 A | 8/2000 | Atou et al. | |
| 6,188,205 B1 | 2/2001 | Tanimoto et al. | |
| 6,219,591 B1 | 4/2001 | Vu et al. | |
| 6,219,623 B1 | 4/2001 | Wills | |
| 6,249,411 B1 | 6/2001 | Hemena et al. | |
| 6,252,310 B1 | 6/2001 | Wilhelm | |
| 6,285,917 B1 | 9/2001 | Sekiguchi et al. | |
| 6,288,456 B1 | 9/2001 | Cratty | |
| 6,347,027 B1 | 2/2002 | Nelson et al. | |
| 6,356,471 B1 | 3/2002 | Fang | |
| 6,359,423 B1 | 3/2002 | Noro | |
| 6,465,910 B2 | 10/2002 | Young et al. | |
| 6,738,692 B2 | 5/2004 | Schienbein et al. | |
| 6,870,279 B2 | 3/2005 | Gilbreth et al. | |

(Continued)

OTHER PUBLICATIONS

Friedman, N.R. "Distributed Energy Resources Interconnection Systems: Technology Review and Research Needs", National Renewable Energy Laboratory, Sep. 2002 (http://www.nrel.gov/docs/fy02osti/32459.pdf, visited Jan. 15, 2008).*

(Continued)

*Primary Examiner*—Stephen W Jackson
*Assistant Examiner*—Hal I Kaplan
(74) *Attorney, Agent, or Firm*—Foley & Lardner LLP

(57) ABSTRACT

A method and apparatus for an interface switch having an external terminal electrically connected to an AC voltage $\bar{E}$ at a frequency $\omega_0$ (for example a utility supply), and an internal terminal electrically connected to an AC voltage $\bar{V}$ at a selectable frequency $\omega$ (for example a microsource). In one embodiment, the interface switch is closed when the voltage difference between $\bar{E}$ and $\bar{V}$ and the relative phase angle $\delta_{EV}$ between $\bar{E}$ and $\bar{V}$ are both small, and when the higher frequency voltage (as between $\bar{E}$ and $\bar{V}$) leads the lower frequency voltage. In another embodiment, the interface switch is closed when the envelope of the voltage difference between $\bar{E}$ and $\bar{V}$ reaches a local minimum at a point of inflection.

25 Claims, 11 Drawing Sheets

U.S. PATENT DOCUMENTS

2003/0036806 A1    2/2003    Schienbein et al.

OTHER PUBLICATIONS

"1547 IEEE Standard for Interconnecting Distributed Resources with Electric Power Systems", Institute of Electrical and Electronics Engineers, Standards Coordinating Committee 21, Jul. 28, 2003 (http://ieeexplore.ieee.org/ie15/8676/27496/01225051.pdf?isnumber=27496&prod=STD&arnumber=1225051&arSt=+0_1&ared=+16&arAuthor=, visited Jan. 14, 2008).*

Robert Lasseter, et al., "Scenarios for Distributed Technology Applications with Steady State and Dynamic Models of Loads and Micro-Sources," Consortium for Electric Reliability Technology Solutions, Apr. 14, 2000.

DOE News, The DER Weekly, vol. 2, No. 10, Mar. 9, 2001, pp. 1-4.

Robert Lasseter, et al., "Integration of Distributed Energy Resources The CERTS MicroGrind Concept," Consortium for Electric Reliability Technology Solutions, Apr. 2002, pp. 1-27.

R.H. Lasseter, "MicroGrids," IEEE, No. 0-7803-7322, Jul. 2002, pp. 305-308.

* cited by examiner relative phase of $\overline{E}$ and $\overline{V}$ as a function of time during island if microgrid was *importing* power prior to islanding $\overline{E}$ (freq. $\omega_0$) "rotates faster" than $\overline{V}$ (freq. $\omega < \omega_0$)

relative phase of $\overline{E}$ and $\overline{V}$ as a function of time during island if microgrid was *exporting* power prior to islanding $\overline{V}$ (freq. $\omega > \omega_0$) "rotates faster" than $\overline{E}$ (freq. $\omega_0$)

INTERFACE SWITCH FOR DISTRIBUTED ENERGY RESOURCES

REFERENCE TO GOVERNMENT RIGHTS

Statement of Goverment Rights

This invention was made with United States government support awarded by the following agencies:
DOE DE-AC03-76SF00098
NSF 0119230

The United States has certain rights in this invention.

FIELD OF THE INVENTION

The present invention relates generally to power and distributed energy resource (DER) systems and methods, and more particularly to interface switch devices and methods therefor.

BACKGROUND OF THE INVENTION

In the United States and around the world, the demand for electrical power continues to grow. At the same time, the public power grid remains subject to occasional failures, even in the United States. These problems with the capacity and reliability of the public power grid have driven the development of distributed energy resources (DER), small independent power generation and storage systems which may be owned by, and located near, consumers of electrical power.

One motivating factor is that distributed energy resources can provide more reliable power in critical applications, as a backup to the primary electrical supply. For example, an interruption of power to a hospital can have life-threatening consequences. Similarly, when power to a factory is interrupted, the resulting losses, for example in productivity, wasted material in process that must be scrapped, and other costs to restart a production line, can be catastrophic. In situations like these, where the loss of electrical power can have serious consequences, the cost of implementing a distributed energy resource as a backup can be justified.

Reliability is not the only factor driving the development of distributed energy resources. Power from a distributed energy resource can, in some cases, be sold back to the main power grid. Geographically distributed sources of power, such as wind, solar, or hydroelectric power, may be too limited or intermittent to be used as the basis for a centralized power plant. By harnessing these types of geographically distributed sources using multiple distributed energy resources, these types of power sources can supplement or replace conventional power sources, such as fossil fuels, when the main power grid is available, and provide backup to their owners when the main power grid is unavailable.

In this context, distributed energy resources (DER) have emerged as a promising option to meet current and future demands for increasingly more reliable electric power. Power sources for DER systems, sometimes called "microsources," range in size and capacity from a few kilowatts up to 10 MW. These power sources may include a variety of technologies, both supply-side and demand-side, and they are typically located where the energy is used. The term "microgrid" is sometimes used for an electrical circuit comprising a power bus, at least one distributed energy resource, and at least one accompanying load on the power bus.

Microgrids and distributed energy resources are usually adapted to operate in either "island" mode or "grid" mode. An interface switch connects the utility grid and the power bus of the microgrid and so the interface switch handles the transitions between island and grid mode and vice-versa. When the microgrid operates in island mode, the interface switch is in an open condition so that the microgrid is electrically isolated from the utility grid. When the microgrid operates in grid mode, the interface switch is in a closed condition so that the microgrid is electrically connected to the utility grid.

Generally, the interface switch has the task of disconnecting all feeders with distributed energy resources, DER, from the grid during protection, IEEE 1547 and power quality events. The interface switch thus plays a key role in the interface between the microgrid and the utility system, responsible for the successful handling of all utility/microgrid interconnection issues and concerns.

Thus, there is a need for an interface switch, and related methods, to enable islanding and re-connection of distributed energy resources in a seamless and automatic manner that minimizes any undesirable voltage transients, current surges, or other undesirable transients or strains on the system. What is further needed is an interface switch, and related methods, that can operate using only locally available information, such as AC voltage magnitude or phase measurements, that can be obtained locally at the terminals of the switch. What is further needed is a simplified interface switch, and related method, that depends only on local measurement of the envelope of the voltage difference across the interface switch for operation.

SUMMARY OF THE INVENTION

The invention relates generally to a method and apparatus for an interface switch having an external terminal bearing an AC voltage E, for example from a utility supply, and an internal terminal bearing an AC voltage V, for example from a microsource, wherein the interface switch is closed when the voltage difference between E and V and the relative phase angle $\delta_{EV}$ between E and V are both small, and when the higher frequency voltage (as between E and V) leads the lower frequency voltage.

A preferred method according to the invention, for a microgrid that imports power from a supply bus, includes measuring a voltage difference between E and V and the relative phase angle $\delta_{EV}$ while the interface switch is open; and closing the interface switch when the voltage difference between E and V is relatively small, when the relative phase angle $\delta_{EV}$ between E and V is relatively small, and when E leads V.

An alternative method according to the invention, for a microgrid that exports power to a supply bus, includes measuring a voltage difference between E and V and the relative phase angle $\delta_{EV}$ while the interface switch is open; and closing the interface switch when the voltage difference between E and V is relatively small, when the relative phase angle $\delta_{EV}$ between E and V is relatively small, and when V leads E.

Another embodiment of the invention relates to an interface switch, adapted for use between an interior power bus with an AC voltage V at a frequency $\omega$ and an exterior power bus with an AC voltage E at a frequency $\omega_0$, that includes an electrical switch and a switch controller that closes the electrical switch when the voltage difference between E and V is small, when the relative phase angle $\delta_{EV}$ between E and V is small, and when the higher frequency voltage leads the lower frequency voltage.

Another alternative embodiment according to the invention relates to a method of operating an interface switch between an internal bus bearing an AC voltage V at a selectable frequency $\omega$ and an external bus bearing an AC voltage E at a frequency $\omega_0$, wherein the interface switch is closed at or just after a time when the envelope of the waveform of the voltage difference between $\overline{E}$ and $\overline{V}$ reaches a local minimum at a point of inflection. This alternative embodiment does not require any measurement of the relative phase angle $\delta_{EV}$ between $\overline{E}$ and $\overline{V}$ or the relative frequencies of $\overline{E}$ and $\overline{V}$.

Yet another embodiment according to the invention relates to an interface switch, between an internal power bus bearing an AC voltage $\overline{V}$ and an external power bus bearing an AC voltage $\overline{E}$, that includes a controllable electrical switch and a switch controller that closes the controllable electrical switch at or just after a time when the envelope of the waveform of the voltage difference between $\overline{E}$ and $\overline{V}$ reaches a local minimum at a point of inflection.

An interface switch according to the invention can be controlled by local logic that verifies constraints at the terminals of the switch before allowing islanding or synchronization, to island and re-connect in a seamless and automatic manner. The AC voltages on either side of the interface switch typically have slightly different frequencies (as discussed below), and an interface switch according to the invention exploits this frequency difference to allow for rapid and seamless reconnection.

An interface switch according to the invention can operate automatically or manually. In the automatic mode, the interface switch uses only local information to decide when to open and close without information from any remote controller. Whether operated manually or automatically, the interface switch according to the invention can provide status information to a remote controller, such as open or closed state, occurrence of open/close event(s), current flow through the switch, and the frequencies and relative phase angles of the voltages on either side of the switch. However, this is not required and an interface switch according to the invention can operate entirely locally without any communication to external systems.

An interface switch according to the invention will typically open when three classes of events occur: (1) "protection" events; (2) "IEEE 1547" events; and (3) "power quality" events. The first two classes of events may occur during either manual or automatic operation, while the third class of events applies only to automatic operation.

When "protection events" occur, the interface switch is opened, for example to island the microgrid because of faults internal or external to the microgrid. The interface switch opens on high current and zero sequence current above a threshold, with an optional delay to allow protection coordination with downstream devices.

When "IEEE 1547" events occur, the interface switch is opened, for example to island the microgrid, because of frequency and voltage excursions (in the power supplied by the feeders and/or utility supply) from a normal range as required by IEEE 1547 or other relevant DER standards. Other utility/microgrid interconnection issues and concerns, such as reverse power flow with a programmable delay, can also be incorporated into the interface switch controls, although this is not required.

Finally, "power quality" events occur when the interface switch is opened to island the microgrid because of the quality of power supplied by the feeders and/or utility supply, for example when power quality is of concern to the customer because of their sensitive loads. Power quality events are expected to be the most prevalent event which activates the switch. The interface switch can open when power quality has deteriorated to a point that causes problems for the customer's equipment, i.e. poor voltage quality from the utility, like a distant fault causing voltage dips that last longer than the local sensitive loads can tolerate, for example the Computer and Business Equipment Manufacturer's Association (CBEMA) criteria.

In an interface switch according to the invention, synchronization is preferably accomplished using only local measurements, and the interface switch closes when two constraints are both satisfied, as discussed in more detail below. First, the voltage across the switch has to be very small (ideally zero). Second, the initial current just after the switch closes should flow in the same direction as current flow at the moment the interface previously opened (before the system islanded). Another way to state the switch closing conditions is that (i) the voltage across the switch must be small; and (ii) the faster rotating voltage must be leading the slower rotating voltage.

When both conditions are satisfied, in a switch and method according to the invention, temporary reverse power flows, power surges, voltage transients, and other undesirable effects can be avoided, reduced, or minimized when the interface switch closes. An interface switch and method according to the invention can satisfy these conditions using several different techniques, as discussed below in more detail.

Other principal features and advantages of the invention will become apparent to those skilled in the art upon review of the following drawings, the detailed description, and the appended claims

DETAILED DESCRIPTION OF THE PREFERRED EMBODIMENTS

Figure 1:
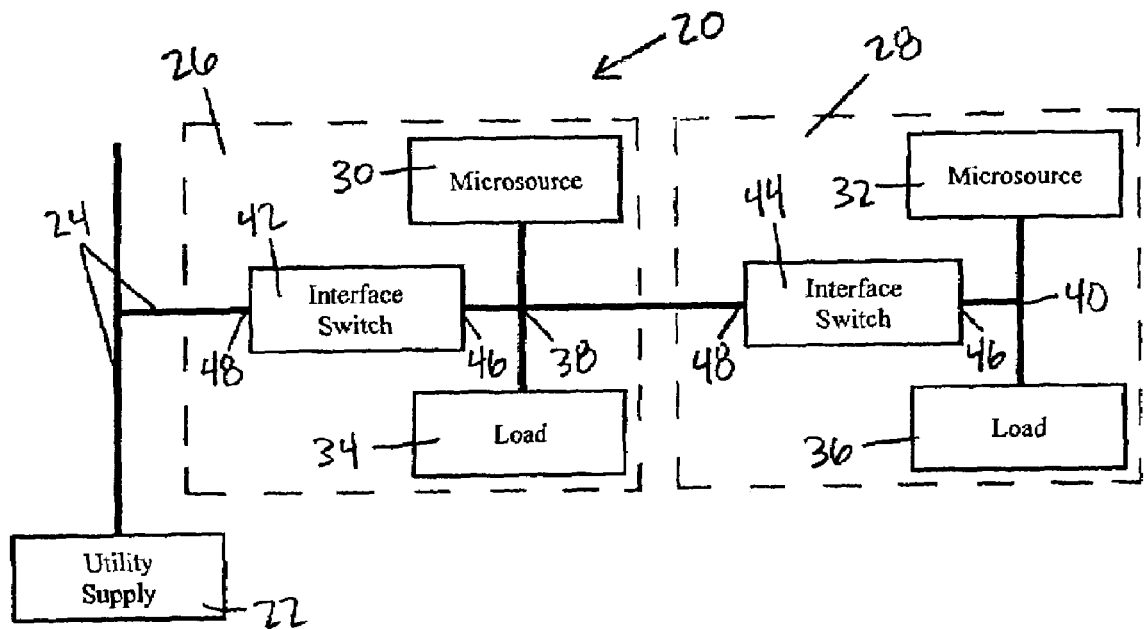
FIG. 1 is a diagram of an exemplary distributed energy resource system that includes two microgrids.

FIG. 1 is a diagram of an exemplary distributed energy resource system, indicated generally at 20, that includes two microgrids. The exemplary distributed energy resource system 20 includes at least one utility supply 22 electrically connected by one or more feeder lines 24 to a first microgrid 26 and a second microgrid 28.

The exemplary first microgrid 26, connected to the first interface switch 42, includes a microsource 30 and a microsource bus 38, and may also include a load 34, although this is not required. The exemplary second microgrid 28, connected to the second interface switch 44, is similar, and includes a microsource 32 and a microsource bus 40, and may optionally include a load 36. Each interface switch 42, 44 has an internal terminal 46 electrically connected to a microsource bus 38, 40 (respectively) and an external terminal 48 electrically connected to a supply bus, for example a feeder line 24 from a utility supply 22.

The exemplary distributed energy resource system 20 includes two interface switches 42, 44 according to the invention. The first interface switch 42 connects the first microgrid 26 to a feeder line 24 from the utility supply 22. The second interface switch 44 connects the second microgrid 28 to the microsource bus 38 of the first microgrid 26. However, these exemplary configurations are not required for use with an interface switch according to the present invention. For example, multiple microgrids can be connected by interface switches in parallel to a central power distribution bus instead of or in addition to series connections. A greater number of microgrids, or a single microgrid, can be used in a distributed energy system that includes an interface switch according to the present invention.

For purposes of this patent applications, and particularly the claims, the terms "supply bus," "power bus," or simply "bus" mean any electrical conductor bearing AC electrical power driven directly or indirectly by a local or remote source of AC electrical power. Exemplary electrical conductors include, but are not limited to, a power line, feeder line, microsource bus, electrical outlet, service drop, service entrance panel, electric meter, hot service entrance conductor, breaker panel hot bus bar, or point of common coupling ("PCC"). Exemplary sources of AC electrical power include, but are not limited to, a microsource, power plant, power utility, generator, alternator, or transformer. An interface switch according to the invention is not limited by the nature of the original source of the AC electrical power, whether it be fossil, nuclear, hydraulic, synthetic fuel, biomass, solar, or any other source of energy.

Each interface switch 42, 44 can be set to an open condition or a closed condition. In the open condition, the internal terminal 46 is electrically isolated from the external terminal 48, substantially preventing or inhibiting current flow through the interface switch. In the closed condition, the internal terminal 46 is electrically connected to the external terminal 48, enabling current to flow substantially unimpeded through the interface switch.

Figure 2:
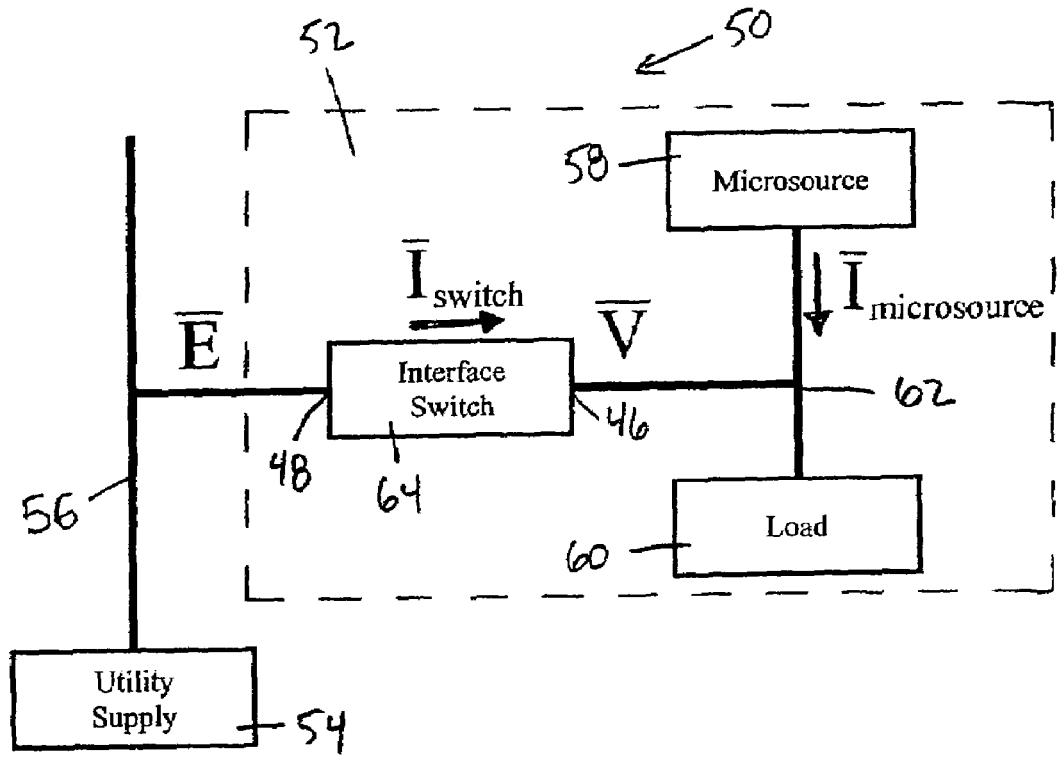
FIG. 2 is a diagram of another exemplary distributed energy resource system that includes a single microgrid.

FIG. 2 is a diagram of another exemplary distributed energy resource system, indicated generally at 50, that includes a single microgrid 52 connected to a utility supply 54 through feeder lines 56. The microgrid 52 includes a microsource 58, a load 60, a microsource bus 62, and an interface switch 64 having an internal terminal 46 and an external terminal 48. The microgrid 52 is in "island" mode when the interface switch 64 is set to an open condition, and the microgrid 52 is in "grid" mode when the interface switch 64 is set to a closed condition.

At any point in time, the status of the microgrid 52 is reflected in voltages and currents at specific points in the microgrid 52. As shown in FIG. 2, $\overline{V}$ is the voltage at the internal terminal 46 of the interface switch 64, and $\overline{E}$ is the voltage at the external terminal 48 of the interface switch 64. Similarly, $\overline{I}_{switch}$ is the current through the interface switch 64, and $\overline{I}_{microsource}$ is the current injected from the microsource 58 into the microsource bus 62. Each of these voltages and currents is a time-varying (AC) quantity, so each voltage or current can be approximated with a sinusoid having a magnitude, an instantaneous frequency, and a relative phase angle.

Figure 3:
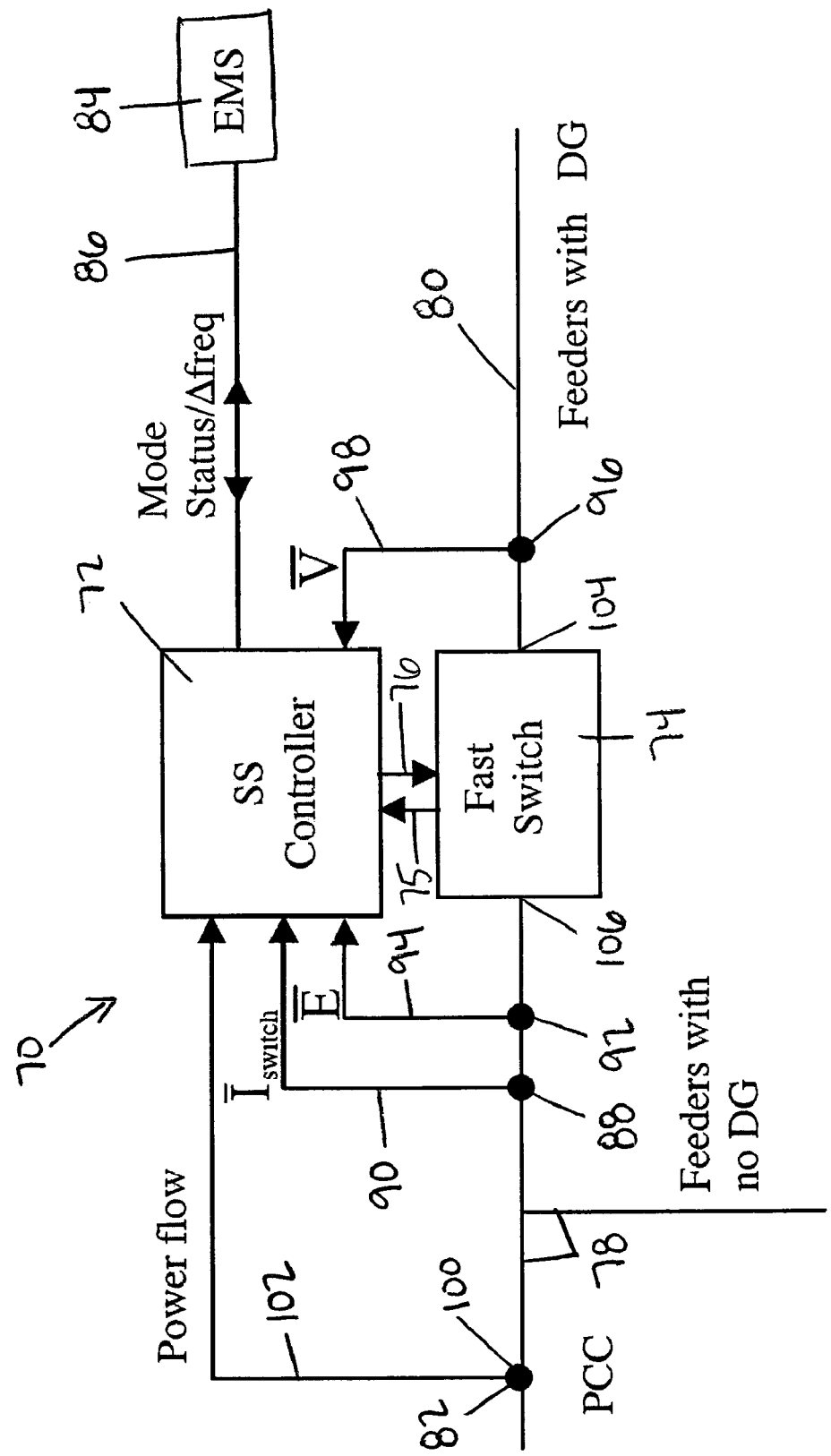
FIG. 3 is a diagram of an exemplary interface switch according to the invention.

FIG. 3 is a diagram of an exemplary interface switch according to the invention, indicated generally at 70. The exemplary interface switch 70 preferably includes a switch controller 72 that controls and monitors an electrical switch 74, for example using a switch status link 75 for status signals and a switch control link 76 for control signals between the switch controller 72 and the switch 74. If provided, the control and status links need not be separate, and a single bidirectional communications link could be used for both control and status signals.

The switch 74 is preferably a fast electrical switch able to transition rapidly between an open condition ("island" mode) and a closed condition ("grid" mode) as directed by the switch controller 72. Such a switch 74 can be implemented, for example, using a vacuum switch, vacuum breaker switch, back-to-back silicon controlled rectifiers ("SCRs"), back to back thyristors, or any other controllable electrical switch technology having suitable switching speed, power handling capacity, and other electrical characteristics. In this context, "controllable" means to be openable or closable under the direction of a control signal. Exemplary back to back thyristors that could be used include, but are not limited to, those made by the ABB Group of Zurich, Switzerland whose web site is located at www.abb.com. Exemplary vacuum circuit breakers that could be used include, but are not limited to, those made by Wyle Laboratories of El Segundo, Calif. whose web site is located at www.wylelabs.com.

The exemplary switch 74 has an external terminal 106 that is electrically connected to a feeder line 78 that leads to a point of common coupling ("PCC") 82 for electrical power from a utility supply or other external power source (not shown in FIG. 3). The exemplary switch 74 has an internal terminal 104 that is electrically connected to a microsource bus 80. However, this is not required and an interface switch according to the invention can be used to connect and disconnect other types of AC power circuits.

When the switch 74 is in a closed condition, the feeder line 78 is electrically connected to the microgrid bus 80, whereby electrical power can flow substantially unimpeded through the switch 74. When the switch is in an open condition, the feeder line 78 is electrically isolated from the microgrid bus 80, so that electrical power does not flow in any substantial amount through the switch 74.

The controller 72 is preferably implemented using a programmable computer or microcontroller, although an analog control apparatus could be used when appropriate. The controller receives status information, such as the voltages $\bar{V}$ and $\bar{V}$ and the current $I_{switch}$, and provides control signals, for example to open or close the switch, over the switch control/status link 76 to the switch 74.

In the exemplary interface switch 70, the switch controller 72 is depicted as part of the interface switch 70. However, this is not required and the switch controller 72 could be located remotely, or incorporated into a subsystem other than the interface switch, while still controlling the switch 74.

The switch controller 72 preferably monitors the voltage $\bar{V}$ at the internal terminal 104 of the switch 74 and the voltage $\bar{E}$ at the external terminal 106 of the switch 74. The current $I_{switch}$ through the switch 74 can also be monitored, for example using an ammeter or switch current sensor 88 that can provide a switch current signal on a signal line 90 to the controller 72, although this is not required.

Similarly, a voltmeter or voltage sensor 92 that measures $\bar{E}$ can supply an external voltage signal on a signal line 94 to the controller 72. A voltmeter or voltage sensor 96 that measures $\bar{V}$ can supply an internal voltage signal on a signal line 98 to the controller 72.

The switch controller 72 preferably also monitors the direction and magnitude of the power flow at the PCC 82. A wattmeter or power sensor 100 that measures power flow at the PCC 82 can provide a power flow signal on a signal line 102.

The interface switch 70, and the controller 72 in particular, may communicate with external systems, such as an energy management system ("EMS") 84, although this is not required. For example, status and control signals may be sent between the controller 72 and the EMS 84 over a control/status communication link 86. Communications between the interface switch 70 and an energy management system (EMS) may include, for example, operational mode, status of the switch and the ability to download event trip levels for all automatic operations events.

Figure 4:
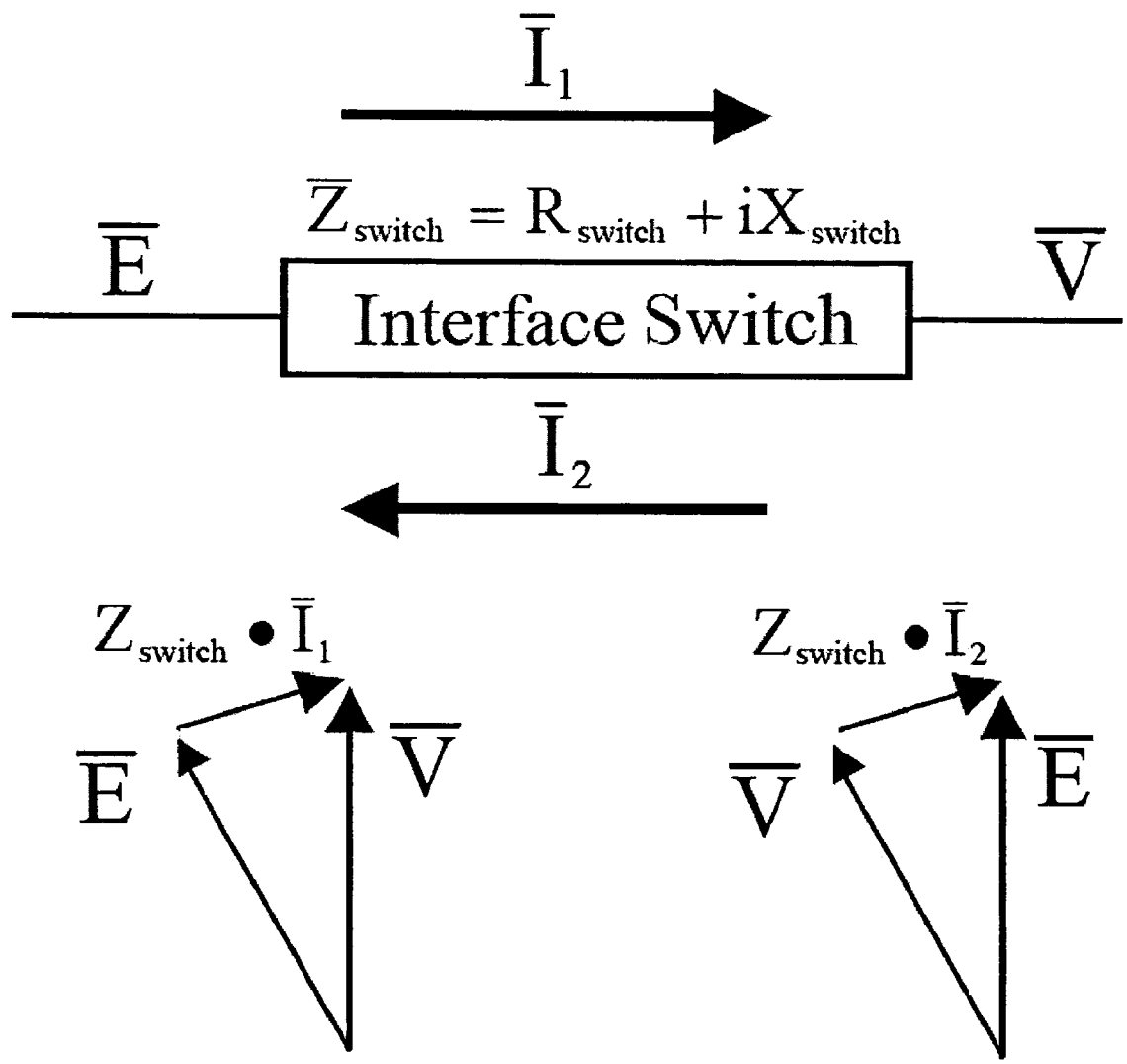
FIG. 4 shows how the initial direction of current flow through an exemplary interface switch when the switch closes depends on the relative phase angles of the voltages on either terminal of the switch.

FIG. 4 shows the circuit state variables of an exemplary interface switch, above two phasor diagrams. By convention, the angles grow in the counter-clockwise direction as time increases in the phasor diagrams of FIGS. 4, 5, and 7. As explained in more detail below, the phasor diagrams depict how the initial direction of current flow (through an exemplary interface switch when the switch closes) depends on the relative phase angles between the AC voltages on either terminal of the switch at the instant of closing and immediately thereafter.

In a microgrid according to our invention in grid mode, the operating frequency $\omega$ of the voltage $\bar{V}$ at the interior terminal of the interface switch (the frequency of the voltage produced by the microsource) matches the nominal operating frequency $\omega_0$ of the voltage $\bar{E}$ at the exterior terminal of the interface switch (for example the frequency of the utility supply). In a microgrid according to our invention, the operating frequency $\omega$ of the voltage $\bar{V}$ from the microsource can change when the interface switch opens (when the microgrid transitions from grid mode to island mode) to adjust the output power of the microsource, in a method known as "power vs. frequency droop."

It should be noted that angular frequencies, measured in rads/second, are often represented using the symbols $\omega$ and $\omega_0$. However, the operating frequencies of electrical supplies are often represented using the symbols f or $f_0$ and usually measured in cycles/second or Hertz. For example, the operating frequency of the electrical grid in the United States is 60 Hz or 60 cycles/second. However, either units can be used since frequencies expressed in rads/second can be easily converted to Hz using the expression $\omega=2\pi f$.

If the microgrid was importing power from the utility supply prior to islanding, the microsource operating frequency decreases ($\omega<\omega_0$) at island, as the output power of the microsource increases to compensate for the lost imported power. At island the frequency $\omega$ of the voltage $\bar{V}$ will be less than the nominal operating frequency $\omega_0$ of the voltage $\bar{E}$ if the microgrid was importing power prior to islanding.

Conversely, if the microgrid was exporting power from the utility supply prior to islanding, the microsource operating frequency increases ($\omega>\omega_0$) at island, as the output power of the microsource decreases since power is not being exported to the utility supply. At island the frequency $\omega$ of the voltage $\bar{V}$ will be greater than the nominal operating frequency $\omega_0$ of the voltage $\bar{E}$ if the microgrid was exporting power prior to islanding.

Thus, at island the voltages $\bar{V}$ and $\bar{E}$ at opposite ends of the interface switch are at different frequencies established by the power vs frequency controller. This is true whether the microgrid was importing power prior to islanding or exporting power prior to islanding. This difference between the frequencies of the voltages $\bar{V}$ and $\bar{E}$ also means that the relative phase angle $\delta_{EV}$ between the voltage $\bar{E}$ and the voltage $\bar{V}$ is constantly changing from a minimum value of zero degrees to a maximum of 180.

As explained in more detail below, the optimal time to close the interface switch (to transition from island mode to grid mode) occurs when the relative phase angle $\delta_{EV}$ is near zero degrees. As discussed above, it is important to minimize the voltage across the interface switch at the instant of closing. The voltage across the interface switch, in other words the difference between the voltage $\bar{E}$ and the voltage $\bar{V}$, is minimized when the relative phase angle $\delta_{EV}$ is minimized.

As discussed above, it is also desirable to ensure that the direction of flow of the resulting current through the switch at the instant of closing and immediately thereafter is in the same direction as the current flow at the moment the system islanded. The direction of flow of the resulting current at the instant of closing and immediately thereafter is also determined by the relative phase angle $\delta_{EV}$ at the instant of closing.

Figure 5:
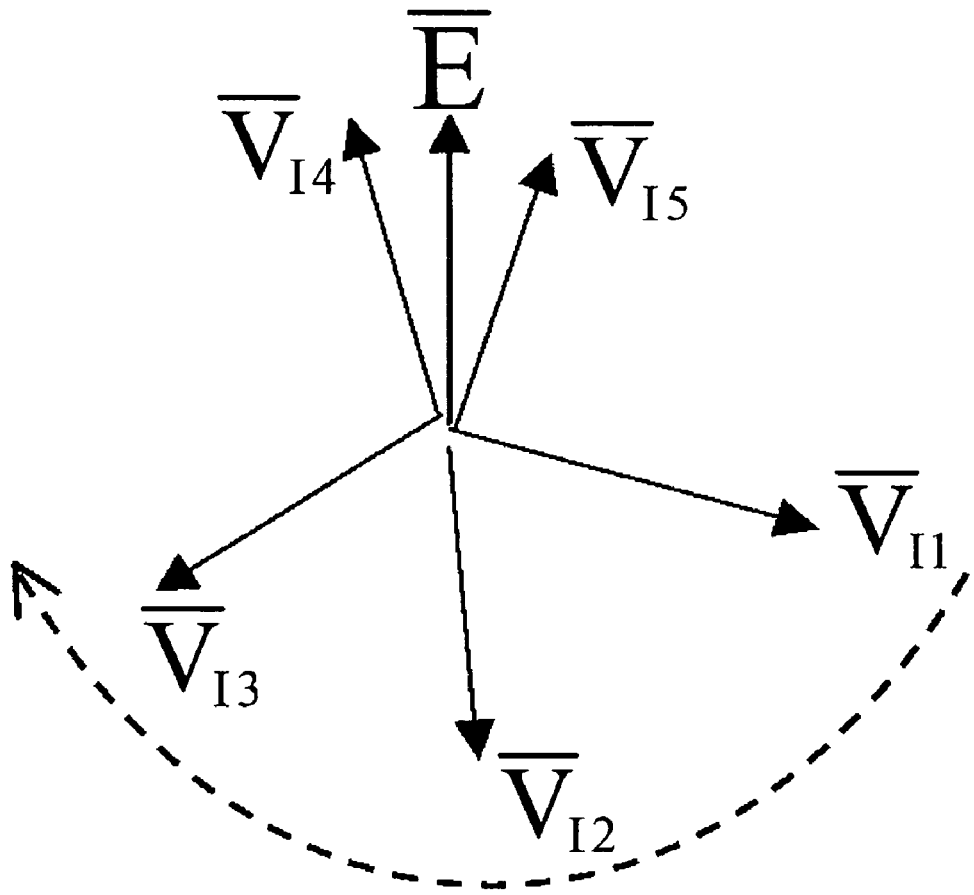
FIG. 5 shows the relative phase angle between the voltages on either terminal of an exemplary interface switch in island mode at five different times, if the microgrid was importing power before islanding.
Figure 7:
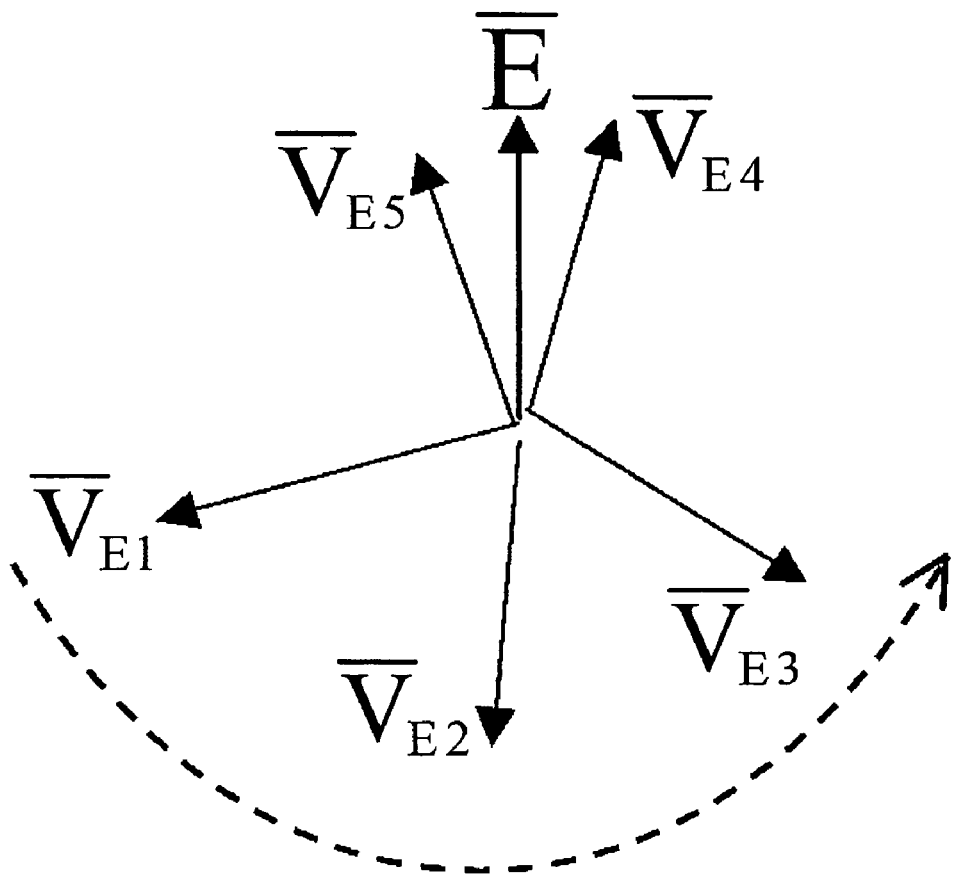
FIG. 7 shows the relative phase angle between the voltages on either terminal of an exemplary interface switch in island mode at five different times, if the microgrid was exporting power before islanding.

In the leftmost phasor diagram in FIG. 4, $\bar{E}$ is ahead of $\bar{V}$ ($\delta_{EV}>0$) at the instant of closing (by convention, the angles grow in the counter-clockwise direction as time increases in the phasor diagrams of FIGS. 4, 5, and 7), so the resulting current $\bar{I}_1$ will flow into the microgrid. A positive value of current flowing into the microgrid means that there is a positive flow of power flowing into the microgrid. In other words, the microgrid is importing power when the flow of current into the microgrid is positive, as shown in the leftmost phasor diagram in FIG. 4. Conversely, as shown in the rightmost phasor diagram in FIG. 4, when $\bar{V}$ is ahead of $\bar{E}$ ($\delta_{EV}<0$) at the instant of closing, the resulting current $\bar{I}_2$ will flow out of the microgrid, so in that case the microgrid is exporting power.

Figure 6A:
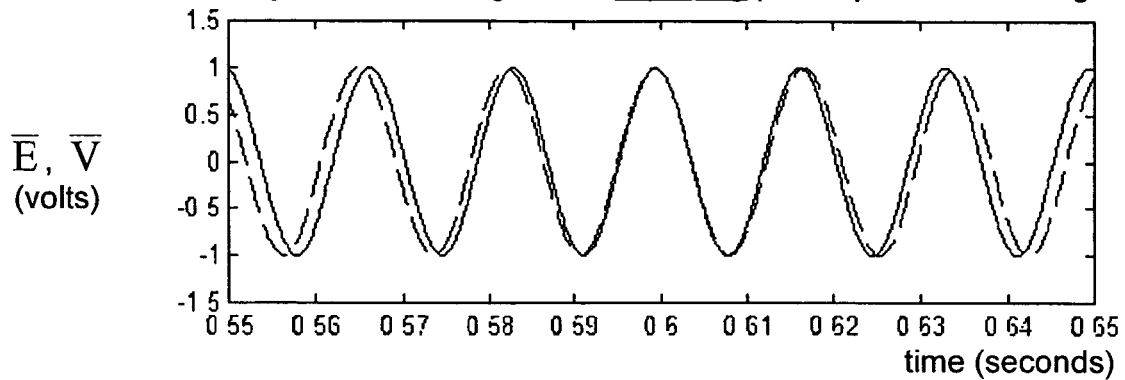
FIG. 6(a) shows the voltages on either terminal of an exemplary interface switch in island mode as a function of time, where the microgrid was importing power before islanding.
Figure 6B:
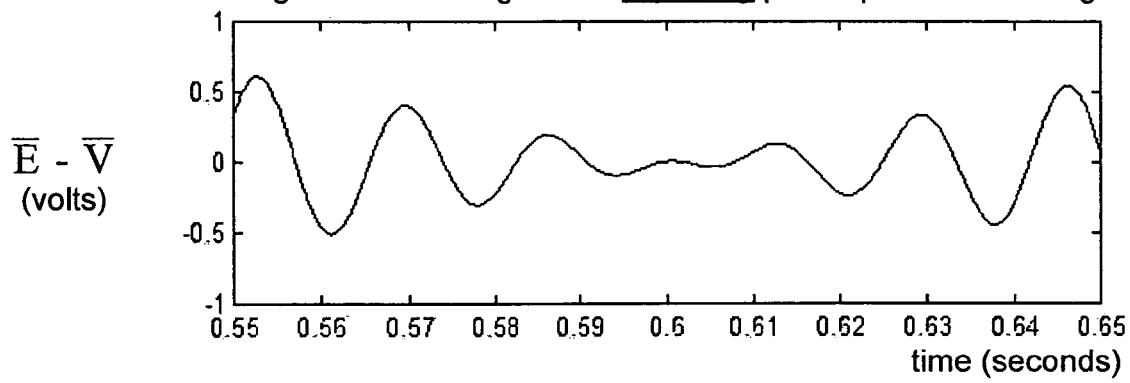
FIG. 6(b) shows the voltage across the interface switch under the conditions of FIG. 6(a)

FIGS. 5, 6(a), and 6(b) illustrate the relationship between the relative phase angle $\delta_{EV}$ and the voltages $\overline{E}$ and $\overline{V}$ as a function of time for a microgrid at island, where the microgrid was importing power prior to islanding. Because the microgrid was importing power prior to islanding, the output power of the microsource has increased at island to compensate for the lost imported power and the microsource operating frequency has decreased ($\omega<\omega_0$).

At island, the voltage $\overline{E}$ (grid side) continues at the nominal utility frequency $\omega_0$ (for example, 60 Hz in the U.S.) in the counterclockwise direction while the voltage $\overline{V}$ (of the island side) rotates at a somewhat lower frequency ($\omega<\omega_0$) in the same counterclockwise direction. Because the frequency of $\overline{E}$ is higher than the frequency of $\overline{V}$, the vector $\overline{V}$ rotates slower than the vector $\overline{E}$, which means that, in the reference frame of the utility supply voltage $\overline{E}$, the vector $\overline{V}$ constantly recedes from $\overline{E}$ in the clockwise direction.

FIG. 5 illustrates this point in more detail, by showing the relative phase angle $\delta_{EV}$ corresponding to five points in time for a microgrid at island, where the microgrid was importing power just prior to islanding, in the reference frame of the utility supply voltage $\overline{E}$. Points $\overline{V}_{I1}$-$\overline{V}_{I4}$ are leading up to the exact moment when $\delta_{EV}=0$ and $\overline{V}_{I5}$ is just after when $\delta_{EV}=0$. Because the microgrid was importing power just prior to the moment the switch opened, current was flowing into the microgrid just prior to the moment the microgrid islanded. As discussed above, it is therefore desirable to ensure that current flows into the microgrid at the moment the interface switch closes to transition the microgrid from island mode back to grid mode.

Because the vector $\overline{V}$ rotates more slowly counterclockwise than $\overline{E}$, as time increases, $\overline{V}$ goes clockwise from position $\overline{V}_{I1}$ to $\overline{V}_{I5}$ relative to $\overline{E}$. As shown in the phasor diagrams of FIG. 4, the magnitude of the current resulting when the switch is closed is proportional to the voltage across the switch (the vector difference between $\overline{E}$ and $\overline{V}$) as the interface switch closes when the microgrid transitions from island back to grid mode.

The vector differences between $\overline{E}$ and $\overline{V}$ are different for each of the positions $\overline{V}_{I1}$ to $\overline{V}_{I5}$, so it follows that the magnitudes of currents through the interface switch would also be different if the interface switch were closed at each of these five positions $\overline{V}_{I1}$ to $\overline{V}_{I5}$. Closing the interface switch at position $\overline{V}_{I2}$ would be an especially poor choice because that position presents the maximum vector difference between $\overline{E}$ and $\overline{V}$, and so it could result in large transients in the current through the switch at the moment of closing.

Closing the interface switch at position $\overline{V}_{I1}$ or $\overline{V}_{I3}$ would be a little better than closing the switch at position $\overline{V}_{I2}$. However, positions $\overline{V}_{I1}$ or $\overline{V}_{I3}$ still present relatively large vector differences between $\overline{E}$ and $\overline{V}$, and so they could result in relatively large transients in current through the switch at the moment of closing.

From the standpoint of minimizing voltage across the switch (minimizing transient current through the switch) at the moment of closing, positions $\overline{V}_{I4}$ and $\overline{V}_{I5}$ are roughly equivalent. The magnitudes of the vector differences between $\overline{E}$ and $\overline{V}$ are roughly the same at these two positions, so the magnitude of any transients in current through the switch at the moment of closing would be roughly the same for either position $\overline{V}_{I4}$ or $\overline{V}_{I5}$.

However, positions $\overline{V}_{I4}$ and $\overline{V}_{I5}$ are not equivalent in terms of the direction of any transient currents through the switch at the moment of closing. At position $\overline{V}_{I4}$, $\overline{V}$ is ahead of $\overline{E}$ ($\delta_{EV}<0$) at the instant of closing, so any transient current at the instant of closing and immediately thereafter will flow out of the microgrid as shown in the rightmost phasor diagram of FIG. 4. At position $\overline{V}_{I5}$, $\overline{E}$ is ahead of $\overline{V}$ ($\delta_{EV}>0$) at the instant of closing, so any transient current at the instant of closing and immediately thereafter will flow into the microgrid as shown in the leftmost phasor diagram of FIG. 4.

Because the microgrid was importing power before islanding, current was flowing into the microgrid just prior to islanding. It is therefore desirable to ensure that any transient current also flows in the same direction (into the microgrid) at the moment the interface switch closes (at the moment the microgrid returns to grid mode). Thus, position $\overline{V}_{I5}$ would be a better choice than position $\overline{V}_{I4}$ for a microgrid that was importing power just prior to islanding, because that position ensures that any transient current through the switch at the moment of closing will be in the correct direction, into the microgrid.

FIG. 6(a) is a graph showing the voltages on either terminal of the switch as a function of time while the microgrid is at island and the switch is open. In FIG. 6(a), the solid line is the voltage $\overline{E}$ and the dotted line is $\overline{V}$. It can be seen from FIG. 6(a) that $\overline{V}$ has a lower frequency, 58 Hz, compared to $\overline{E}$ at 60 Hz. It should be noted that the 2 Hz difference in frequency between $\overline{V}$ and $\overline{E}$ is exemplary, and exaggerated for illustration. A smaller frequency difference, such as 0.5 Hz, or a larger frequency difference could be used in practice. It should also be noted that if the frequency difference is too small, the optimal closing time may occur too infrequently. In such a case, an artificial frequency difference can be introduced to ensure that optimal closing times occur more frequently.

FIG. 6(b) is a graph showing the difference between the voltages on either terminal of the switch as a function of time, in other words the voltage across the static switch. The best time to close the interface switch is when the voltage across the switch is very small and the voltage $\overline{E}$ is leading the voltage $\overline{V}$. In FIG. 6(b) any time between 0.59 and 0.62 seconds is a good time to synchronize to the grid and close the switch. The conditions that need to be simultaneously satisfied are: i) the voltage across the switch must be very small; and ii) the fastest rotating voltage must be leading the voltage that rotates slower.

It should be noted that the term "leading" as used herein, and particularly in the claims, means to have a greater phase angle. Referring to FIG. 6(a), around time 0.62 seconds, it can be seen that the dotted line (for voltage $\overline{V}$) is slightly "ahead" of the solid line (for voltage $\overline{E}$) in the sense of two horses running left to right across the page. However, the meaning of "leading" in this context is different. Here, the solid line (for voltage $\overline{E}$) is leading the dotted line (for voltage $\overline{V}$) in the sense that voltage $\overline{E}$ has a greater phase angle. In other words, voltage $\overline{E}$ "leads" around time 0.62 seconds because it reaches a value of 0 volts at a time slightly earlier than the voltage $\overline{V}$ reaches that same value.

Figure 6C:
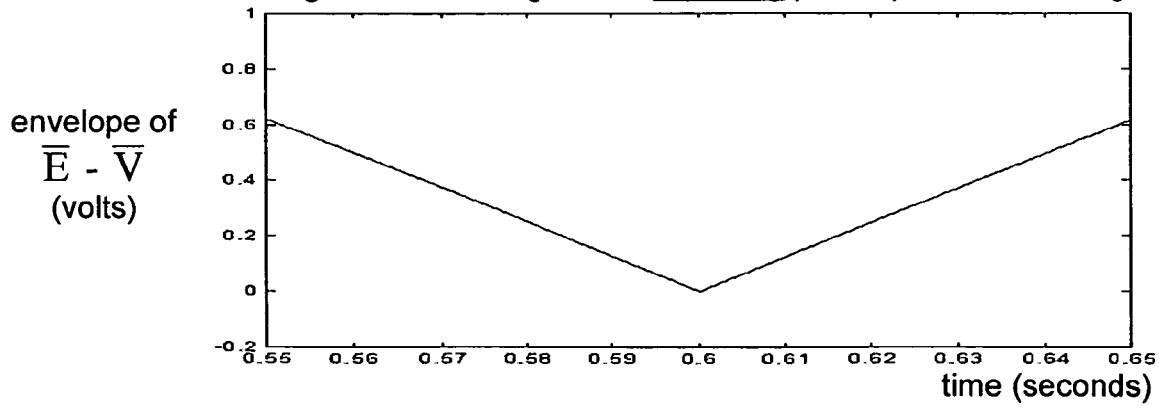
FIG. 6(c) shows the envelope of the magnitude of the voltage waveform across the interface switch under the conditions of FIG. 6(a)-6(b)

FIG. 6(c) shows the envelope of $\overline{E}-\overline{V}$ as a function of time, under the conditions of FIGS. 6(a)-6(b). In other words, FIG. 6(c) shows the general trend of the amplitude of the $\overline{E}-\overline{V}$ (the voltage across the interface switch) waveform. The envelope of $\overline{E}-\overline{V}$ as a function of time can be determined or measured in a variety of ways known in the art, including but not limited to low pass filtering, any of the demodulation techniques used in amplitude modulation (AM) communications, or digital signal processing.

Inspection of FIG. 6(c) shows that the envelope of the waveform of the voltage difference between $\overline{E}$ and $\overline{V}$ reaches a local minimum at a point of inflection and then begins to increase at around time 0.6 seconds. Importantly, that point in time can be identified by monitoring the envelope of the waveform of the voltage difference between $\overline{E}$ and $\overline{V}$ only, without measuring the relative phase angle $\delta_{EV}$ between the voltage $\overline{E}$ and the voltage $\overline{V}$. Thus, monitoring the envelope of the waveform of $\overline{E}-\overline{V}$ for the occurrence of a local minimum at a point of inflection can provide a simplified technique for choosing when to close an interface switch according to the invention. For example, a time between 0.60-0.61 seconds or shortly thereafter would be a good time to close an interface switch according to the invention under the conditions of FIGS. 6(a)-6(c).

Figure 8A:
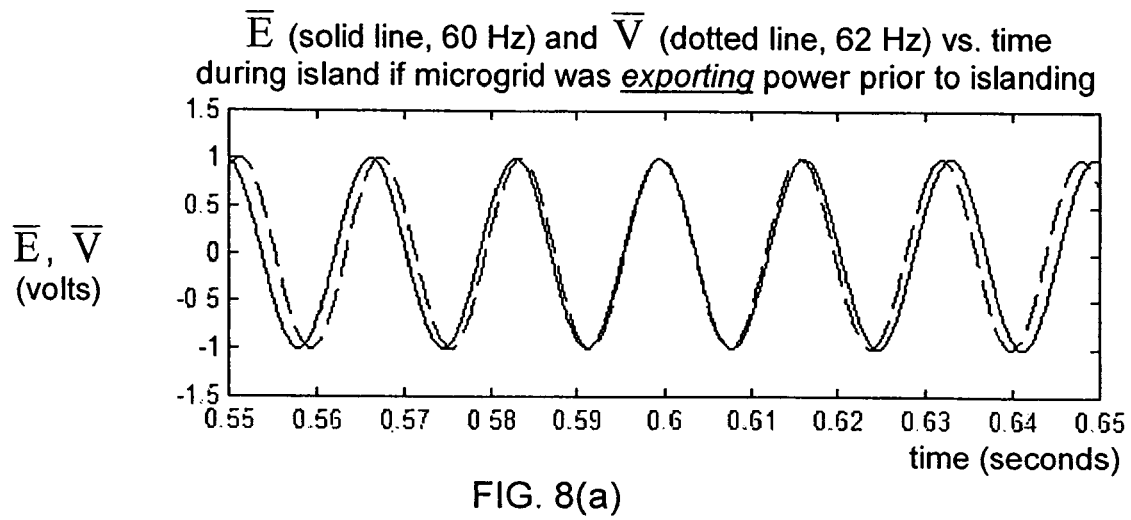
FIG. 8(a) shows the voltages on either terminal of an exemplary interface switch in island mode as a function of time, where the microgrid was exporting power before islanding.
Figure 8B:
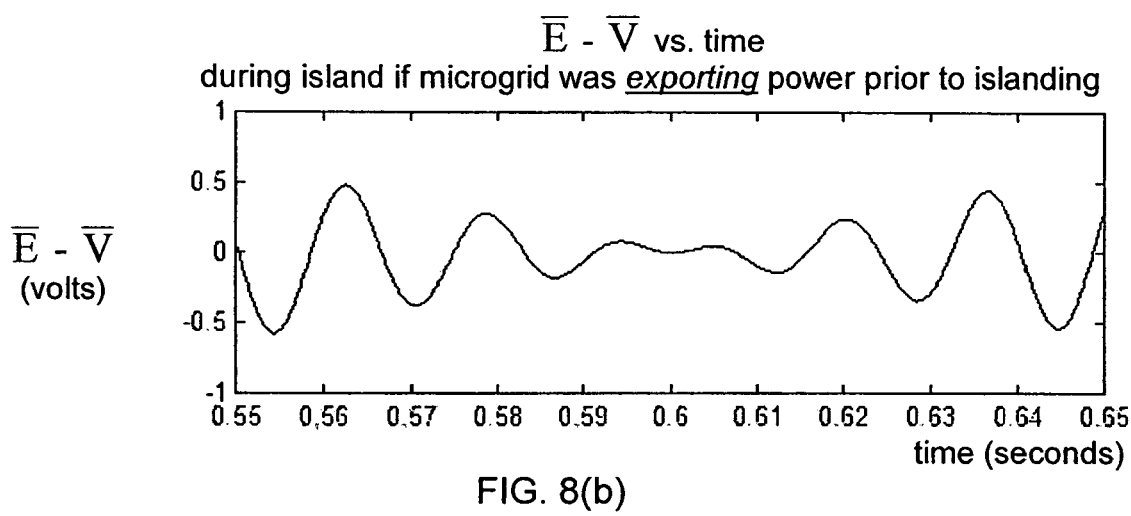
FIG. 8(b) shows the voltage across the interface switch under the conditions of FIG. 8(a)

FIGS. 7, 8(a), and 8(b) illustrate the relationship between the relative phase angle $\delta_{EV}$ and the voltages $\overline{E}$ and $\overline{V}$ as a function of time for a microgrid at island, where the microgrid was exporting power prior to islanding. Because the microgrid was exporting power prior to islanding, the output power of the microsource has decreased at island to compensate since the microgrid is no longer exporting power and the microsource operating frequency has increased ($\omega>\omega_0$).

At island, the voltage $\overline{E}$ (grid terminal) continues at the nominal utility frequency $\omega_0$ (for example, 60 Hz in the U.S.) in the counterclockwise direction while the voltage $\overline{V}$ (of the island side) rotates at a somewhat higher frequency ($\omega>\omega_0$) in the same counterclockwise direction. Because the frequency of $\overline{E}$ is lower than the frequency of $\overline{V}$, the vector $\overline{V}$ rotates faster than the vector $\overline{E}$, which means that, in the reference frame of the utility supply voltage $\overline{E}$, the vector $\overline{V}$ constantly runs away from $\overline{E}$ in the counterclockwise direction.

FIG. 7 illustrates this point in more detail, by showing the relative phase angle $\delta_{EV}$ corresponding to five points in time for a microgrid at island, where the microgrid was exporting power just prior to islanding, in the reference frame of the utility supply voltage $\overline{E}$. Points $\overline{V}_{E1}$-$\overline{V}_{E4}$ are leading up to the exact moment when $\delta_{EV}=0$ and $\overline{V}_{E5}$ is just after when $\delta_{EV}=0$. Because the microgrid was exporting power just prior to the moment the switch opened, current was flowing out of the microgrid just prior to the moment the microgrid islanded. As discussed above, it is therefore desirable to ensure that current again flows out of the microgrid at the moment the interface switch closes to transition the microgrid from island mode back to grid mode.

Because the vector $\overline{V}$ rotates more rapidly counterclockwise than $\overline{E}$, as time increases, $\overline{V}$ goes counterclockwise from position $\overline{V}_{E1}$ to $\overline{V}_{E5}$ relative to $\overline{E}$. As shown in the phasor diagrams of FIG. 4, the magnitude of the current resulting when the switch is closed is proportional to the voltage across the switch (the vector difference between $\overline{E}$ and $\overline{V}$) as the interface switch closes when the microgrid transitions from island back to grid mode.

Like the situation shown in FIG. 5, the vector differences between $\overline{E}$ and $\overline{V}$ are different for each of the positions $\overline{V}_{E1}$ to $\overline{V}_{E5}$, so it follows that the magnitudes of currents through the interface switch would also be different if the interface switch were closed at each of these five positions $\overline{V}_{E1}$ to $\overline{V}_{E5}$. Closing the interface switch at position $\overline{V}_{E2}$ would be an especially poor choice, and positions $\overline{V}_{E1}$ or $\overline{V}_{E3}$ would be only a little better. Like the situation shown in FIG. 5, positions $\overline{V}_{E4}$ and $\overline{V}_{E5}$ are roughly equivalent from the standpoint of minimizing transient current through the switch at the moment of closing. The magnitudes of the vector differences between $\overline{E}$ and $\overline{V}$ are roughly the same at these two positions.

Like the situation shown in FIG. 5, however, positions $\overline{V}_{E4}$ and $\overline{V}_{E5}$ are not equivalent in terms of the direction of any transient currents through the switch at the moment of closing. At position $\overline{V}_{E4}$, $\overline{E}$ is ahead of $\overline{V}$ ($\delta_{EV}>0$) at the instant of closing, so any transient current at the instant of closing and immediately thereafter will flow into the microgrid. At position $\overline{V}_{E5}$, $\overline{V}$ is ahead of $\overline{E}$ ($\delta_{EV}<0$) at the instant of closing, so any transient current at the instant of closing and immediately thereafter will flow out of the microgrid as shown in the rightmost phasor diagram of FIG. 4.

Because the microgrid was exporting power before islanding, current was flowing out of the microgrid just prior to islanding. It is therefore desirable to ensure that any transient current also flows in the same direction (out of the microgrid) at the moment the interface switch closes (at the moment the microgrid returns to grid mode). Thus, position $\overline{V}_{E5}$ would be a better choice than position $\overline{V}_{E4}$ for a microgrid that was exporting power just prior to islanding, because that position ensures that any transient current through the switch at the moment of closing will be in the correct direction, out of the microgrid.

FIG. 8(a) is a graph showing the voltages on either terminal of the switch as a function of time while the microgrid is at island and the switch is open. In FIG. 8(a), the dotted line is the voltage $\overline{V}$ and the solid line is $\overline{E}$. It can be seen from FIG. 8(a) that $\overline{V}$ has a higher frequency compared to $\overline{E}$.

FIG. 8(b) is a graph showing the difference between the voltages on either terminal of the switch as a function of time, in other words the voltage across the static switch. The best time to close the interface switch is when the voltage across the switch is very small and the voltage $\overline{V}$ is leading the voltage $\overline{E}$. In FIG. 8(b) any time between 0.59 and 0.62 seconds is a good time to synchronize to the grid and close the switch. The conditions that need to be simultaneously satisfied are: i) the voltage across the switch must be very small; and ii) the fastest rotating voltage must be leading the voltage that rotates slower.

Figure 8C:
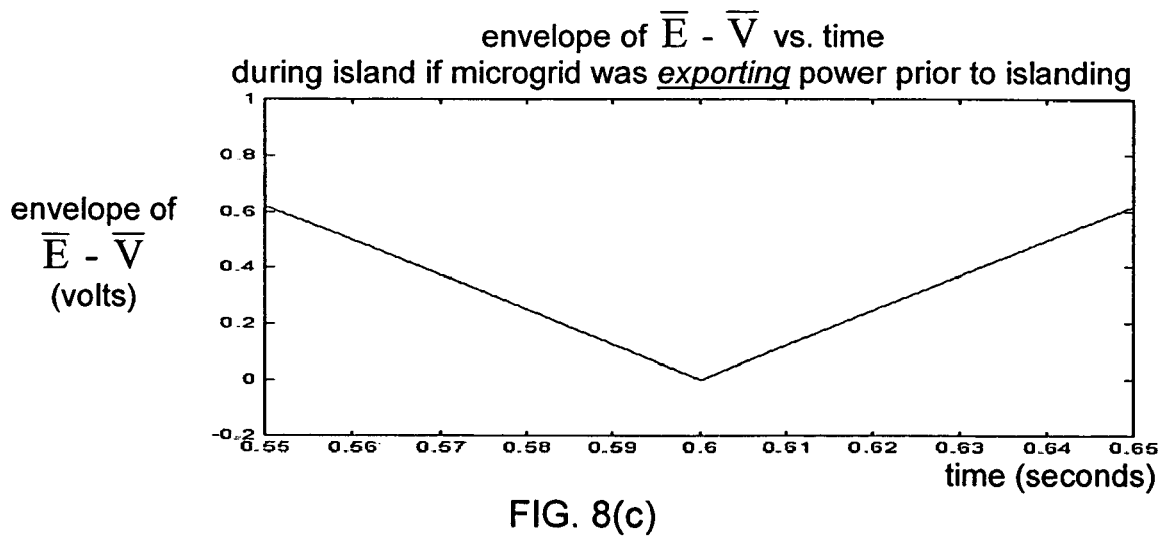
FIG. 8(c) is a graph showing the envelope of the magnitude of the voltage waveform across the interface switch under the conditions of FIG. 8(a)-8(b)

Similar to FIG. 6(c), FIG. 8(c) shows the envelope of $\overline{E}$-$\overline{V}$ as a function of time, under the conditions of FIGS. 8(a)-8(b). Inspection of FIG. 8(c) shows that the envelope of the waveform of the voltage difference between $\overline{E}$ and $\overline{V}$ reaches a local minimum at a point of inflection and then begins to increase at around time 0.6 seconds. Thus, the technique of monitoring the envelope of the waveform of $\overline{E}-\overline{V}$ for the occurrence of a local minimum at a point of inflection can be used in an interface switch according to the invention without regard to the direction of power transfer (import or export), if any, through the switch.

Figure 9:
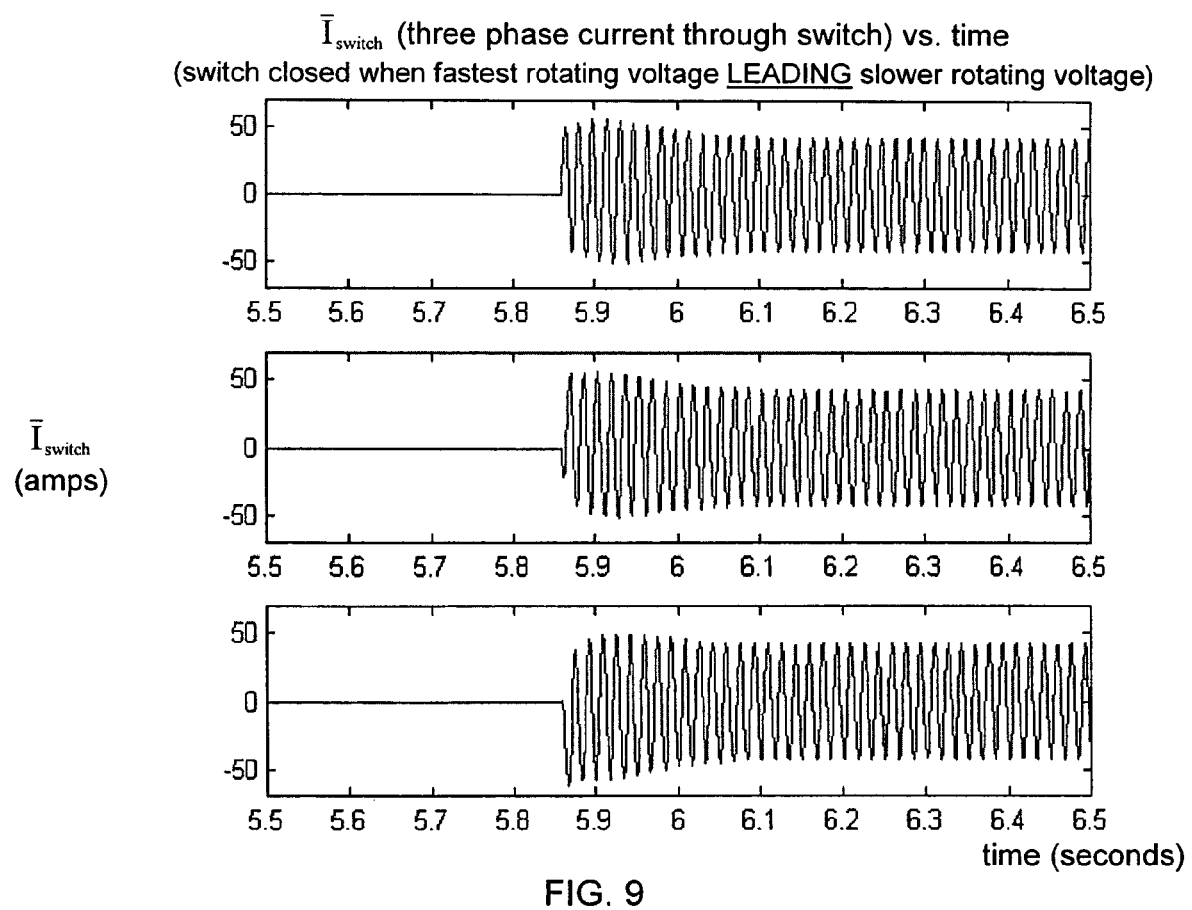
FIG. 9 is a graph of the predicted three phase currents as a function of time through an exemplary interface switch closed at a time when the voltage across the switch is small and the faster rotating voltage is leading the slower rotating voltage, according to the present invention.
Figure 10:
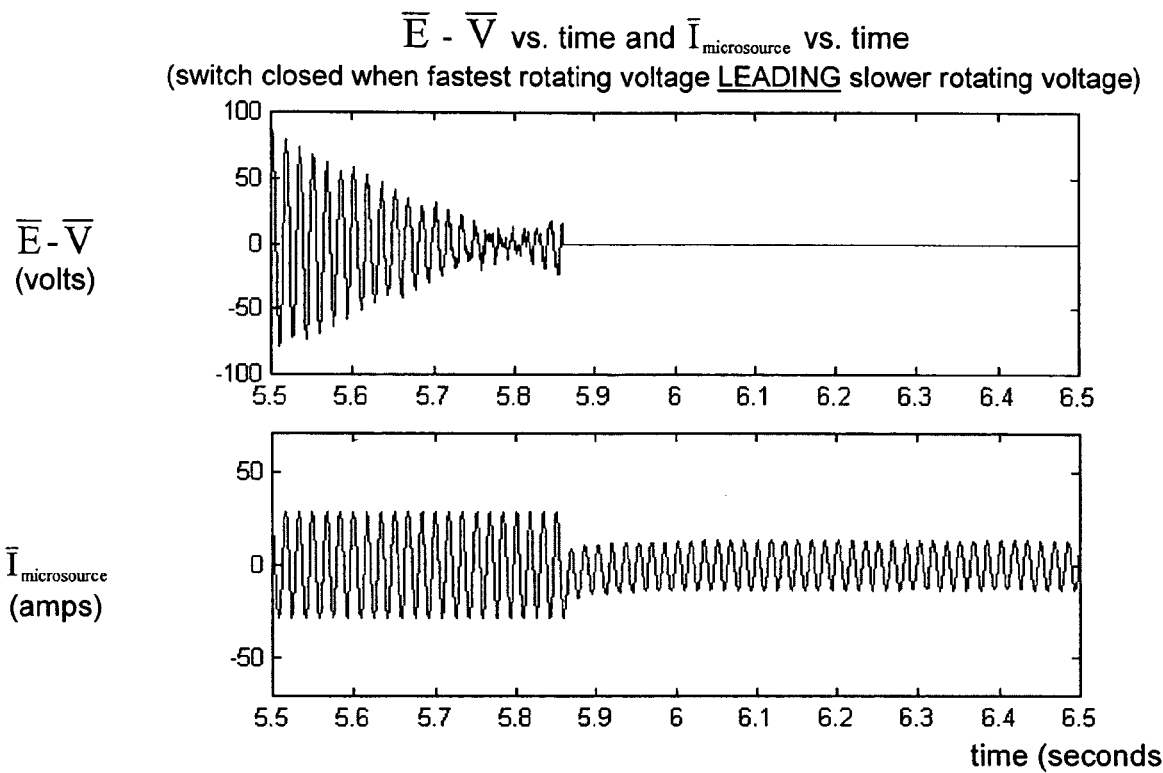
FIG. 10 presents graphs of the voltage across an exemplary interface switch as a function of time and of the current from the microsource as a function of time, under the conditions of FIG. 9.
Figure 11:
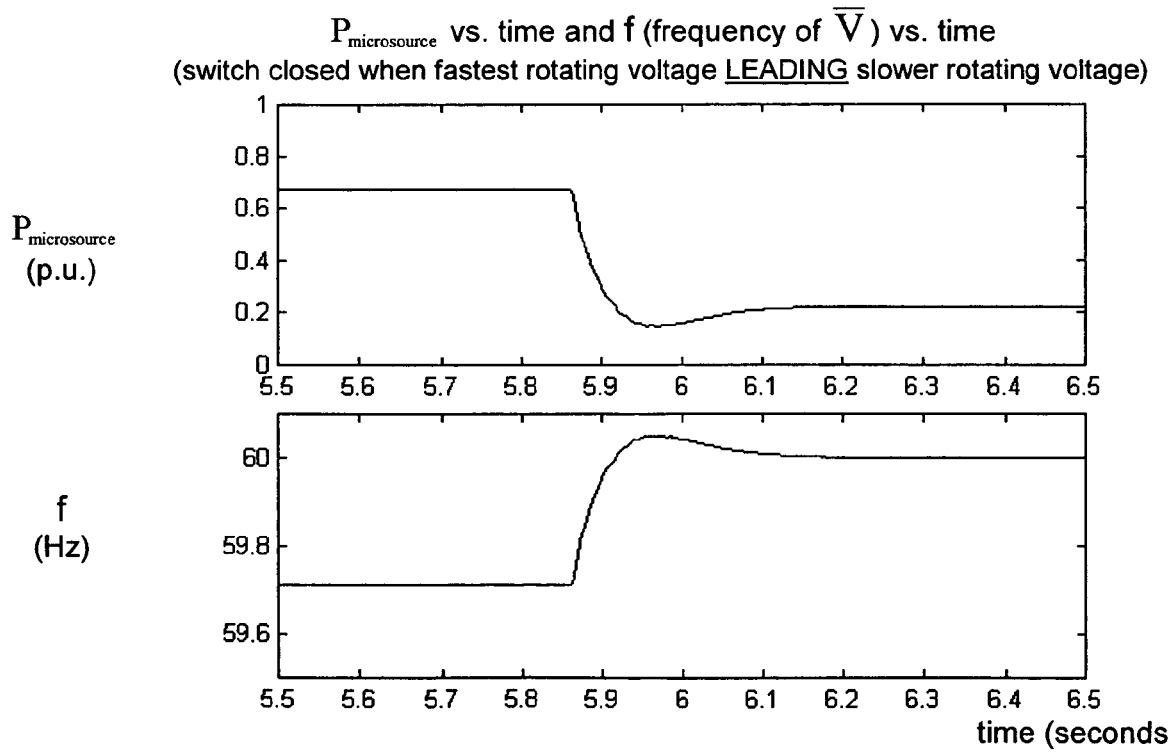
FIG. 11 presents a graph of the power injected by the microsource as a function of time and a graph of the instantaneous frequency of the voltage supplied by the microsource as a function of time, under the conditions of FIGS. 10-11.

FIGS. 9-11 present predicted results for an interface switch operated according to the invention. FIG. 9 is a graph of the predicted three phase currents through an interface switch as a function of time when the switch closes, if the higher frequency voltage leads the lower frequency voltage at the moment the switch closes.

FIG. 10 presents a graph of the voltage across the switch as a function of time and a graph of the current from the micro source as a function of time, under the conditions of FIG. 9. The envelope of the voltage across the switch shows the switching event after the minimum point. The plot of the current from the microsource shows that after the switching event the current drops to the lower value without any overshoot. FIG. 11 presents a graph of the power injected by the microsource as a function of time and a graph of the instantaneous frequency of the voltage supplied by the microsource as a function of time, under the conditions of FIG. 9. From FIGS. 9-11, it should be noticed that: a) the current from the grid increases from zero on all three phases; and b) after the interface switch closes, the microsource backs off to the requested power output level without any overshoot.

Figure 12:
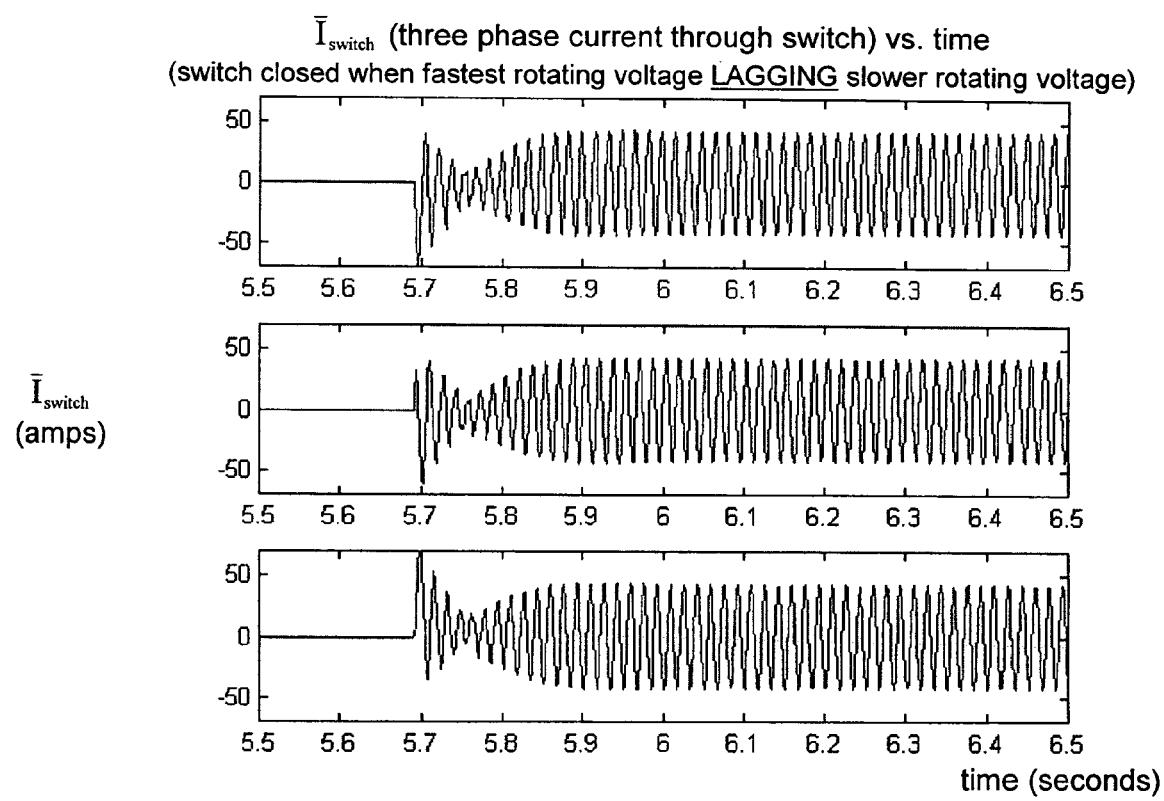
FIG. 12 is a graph of the predicted three phase currents as a function of time through an interface switch closed at a time when the faster rotating voltage is lagging the slower rotating voltage, contrary to the present invention.
Figure 13:
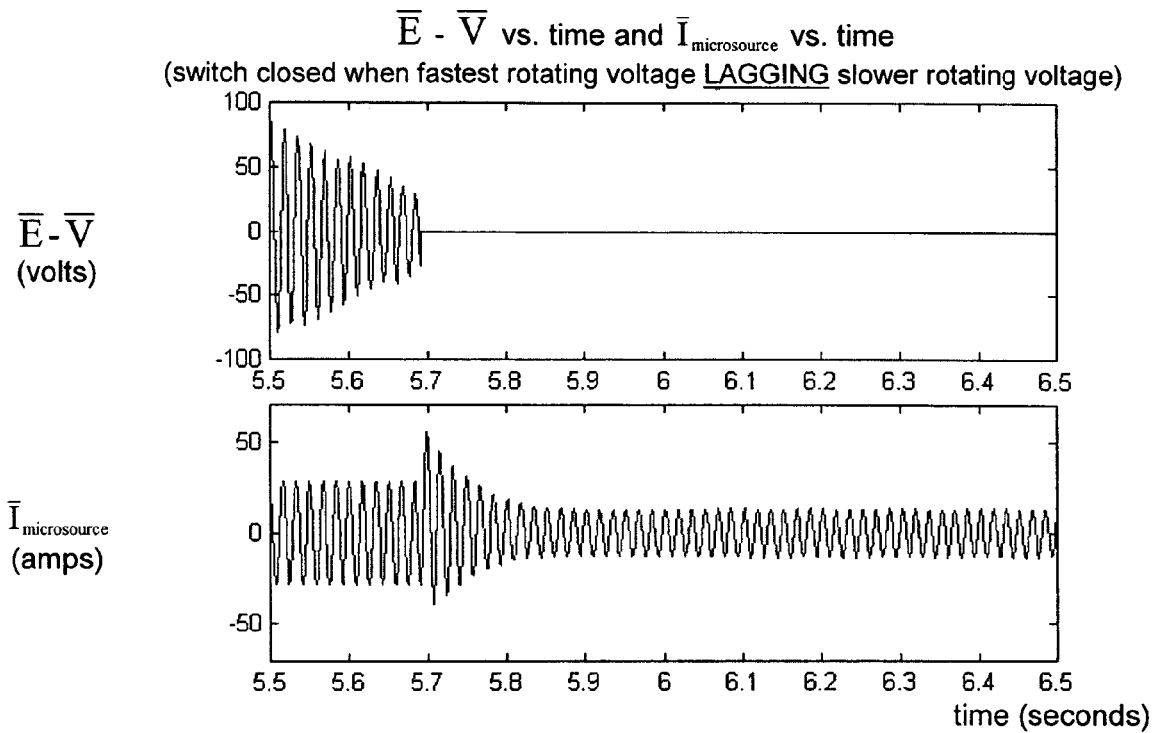
FIG. 13 presents a graph of the voltage as a function of time across an interface switch and a graph of the current from the microsource as a function of time, under the conditions of FIG. 12.
Figure 14:
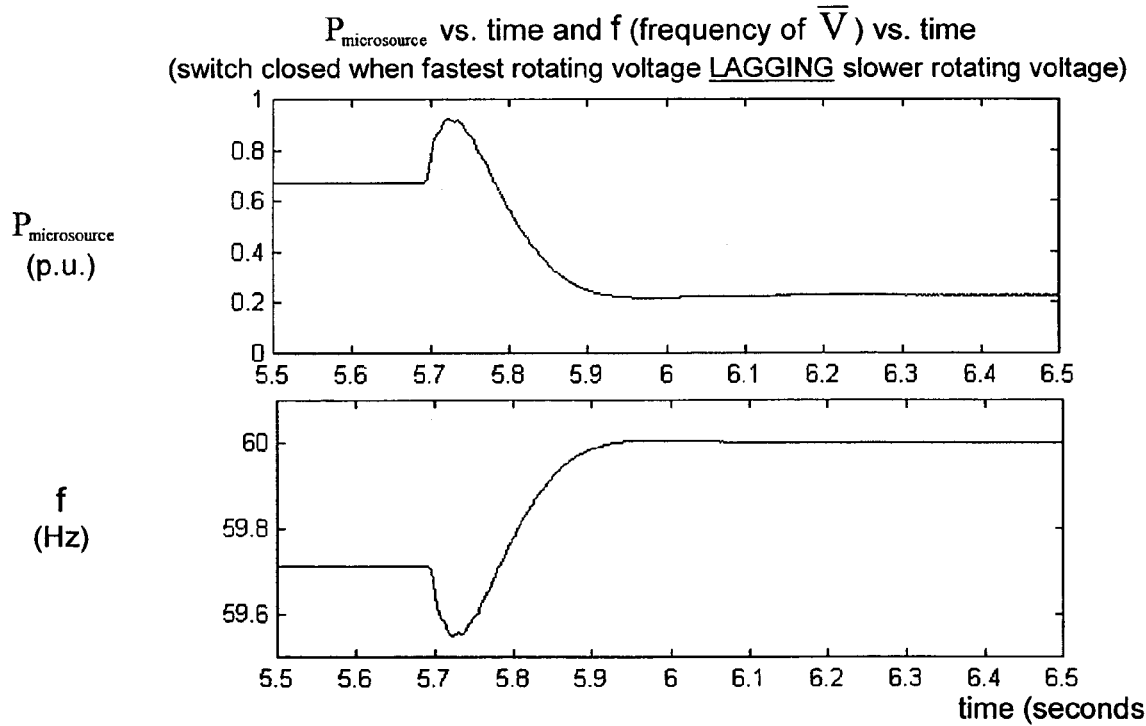
FIG. 14 presents a graph of the power injected by the microsource as a function of time and a graph of the instantaneous frequency of the voltage supplied by the microsource as a function of time, under the conditions of FIG. 12-13.

To demonstrate the importance of the second condition for synchronizing, FIGS. 12-14 present predicted results with an interface switch, if the higher frequency voltage does not lead the lower frequency voltage at the moment the switch closes. In other words, FIGS. 12-14 present predicted results with an interface switch operated in a fashion contrary to the present invention. FIG. 12 shows the currents flowing in the interface switch while FIG. 13 shows the voltage across the interface switch on the upper plot and the current injected by the micro source on the lower plot. FIG. 14 shows the active power injected by the unit on the upper plot and the frequency of the microgrid on the lower plot.

FIG. 12 is a graph of the predicted three phase currents as a function of time through an interface switch when the switch closes, when the interface switch is operated contrary to the present invention. In particular, FIG. 12 shows the predicted three phase currents if the interface switch is closed at a moment when the lower frequency voltage leads the higher frequency voltage.

FIG. 13 presents a graph of the voltage as a function of time across an interface switch and a graph of the current from the microsource as a function of time, under the conditions of FIG. 12.

FIG. 14 presents a graph of the power injected by the microsource as a function of time and a graph of the instantaneous frequency of the voltage supplied by the microsource as a function of time, under the conditions of FIG. 12.

From FIGS. 12-14, it should be noticed that: a) the current from the grid increases, then goes to zero (reversing) and then increases again on all three phases; b) After the interface switch closes, the microsource injects even more power than when islanded (to feed the grid) then backs off immediately to the requested power output level; and c) The load always takes the same amount of power since its voltage is unperturbed, so the extra power that the microsource generates transiently goes into the grid.

The microsource power $P_{microsource}$ command is 0.2 pu, while the load takes 0.65 pu (all provided by the unit during island mode). Transiently the source generates up to 0.9 pu, with the extra power being injected in the grid.

This synchronizing behavior is undesirable because: 1) When the current reverses, also the flux in the magnetic cores of the transformers will change sign, creating a magnetoelectro-dynamic stress on the coils and it is reasonable to assume that every inversion transient will lower the life of the equipment; and 2) Because the output power of the microsource overshoots on switch closing, it is impossible to synchronize when the unit operates near its rated power (at 0.9 pu, for example) since this overshoot would bring the operating point beyond the rating of the source and, as a result of this, the equipment will trip.

It is important to note that the construction and arrangement of the steps in the methods, and the elements of the structures, shown in the exemplary embodiments discussed herein are illustrative only. Those skilled in the art who review this disclosure will readily appreciate that many modifications are possible (e.g., variations in sizes, dimensions, structures, shapes and proportions of the various elements, values of parameters, mounting arrangements, materials, transparency, color, orientation, etc.) without materially departing from the novel teachings and advantages of the invention.

The order or sequence of any process or method steps may be varied or re-sequenced according to alternative embodiments. Other substitutions, modifications, changes and/or omissions may be made in the design, operating conditions and arrangement of the preferred and other exemplary embodiments without departing from the spirit of the present invention as expressed in the appended claims.

The components of the invention may be mounted to each other in a variety of ways as known to those skilled in the art. As used in this disclosure and in the claims, the terms mount and attach include embed, glue, join, unite, connect, associate, hang, hold, affix, fasten, bind, paste, secure, bolt, screw, rivet, solder, weld, and other like terms. The term cover includes envelop, overlay, and other like terms.

While the exemplary embodiments illustrated in the figures and described above are presently preferred, it should be understood that these embodiments are offered by way of example only. Other embodiments may include, for example, different techniques for power calculation, voltage control, power control, or droop control. The invention is not limited to a particular embodiment, but extends to various modifications, combinations, and permutations that nevertheless fall within the scope and spirit of the appended claims.

It is understood that the invention is not confined to the embodiments set forth herein as illustrative, but embraces all such forms thereof that come within the scope of the following claims.

What is claimed is:

1. A method of operating an interface switch associated with a microgrid, the method comprising:

receiving an AC voltage $\overline{V}$ at an internal terminal of the interface switch from a microsource bus, wherein the internal terminal of the interface switch is electrically connected to the microsource bus, and further wherein an external terminal of the interface switch is electrically connected to a supply bus having an AC voltage $\overline{E}$; determining a voltage difference between the AC voltage $\overline{E}$ and the AC voltage $\overline{V}$ when the interface switch is in an open position; determining a relative phase angle $\delta_{EV}$ between the AC voltage $\overline{E}$ and the AC voltage $\overline{V}$ while the interface switch is in the open position; closing the interface switch upon detection that the voltage difference between the AC voltage $\overline{E}$ and the AC voltage $\overline{V}$ is less than a first predetermined threshold, the relative phase angle $\delta_{EV}$ between the AC voltage $\overline{E}$ and the AC voltage $\overline{V}$ is less than a second predetermined threshold, and the AC voltage $\overline{E}$ leads the AC voltage $\overline{V}$; and importing electrical power from the supply bus to the microsource bus through the closed interface switch.

2. The method of claim 1, wherein the first predetermined threshold comprises 10% of an average peak value of the AC voltage $\overline{E}$.

3. The method of claim 1, wherein the first predetermined threshold comprises 3% of an average peak value of the AC voltage $\overline{E}$.

4. The method of claim 1, wherein the second predetermined threshold comprises 10 degrees.

5. The method of claim 1, wherein the second predetermined threshold comprises 3 degrees.

6. The method of claim 1, wherein the supply bus receives the AC voltage $\overline{E}$ directly or indirectly from a utility grid.

7. A method of operating an interface switch associated with a microgrid, the method comprising:

receiving an AC voltage $\overline{V}$ at an internal terminal of the interface switch from a microsource bus, wherein the internal terminal of the interface switch is electrically connected to the microsource bus, and further wherein an external terminal of the interface switch is electrically connected to a supply bus having an AC voltage $\overline{E}$; determining a voltage difference between the AC voltage $\overline{E}$ and the AC voltage $\overline{V}$ when the interface switch is in an open position; determining a relative phase angle $\delta_{EV}$ between the AC voltage $\overline{E}$ and the AC voltage $\overline{V}$ while the interface switch is in the open position; closing the interface switch upon detection that the voltage difference between the AC voltage $\overline{E}$ and the AC voltage $\overline{V}$ is less than a first predetermined threshold, the relative phase angle $\delta_{EV}$ between the AC voltage $\overline{E}$ and the AC voltage $\bar{V}$ is less than a second predetermined threshold, and the AC voltage $\bar{V}$ leads the AC voltage $\bar{E}$; and exporting electrical power from the microsource bus to the supply bus through the closed interface switch.

8. The method of claim 7, wherein the first predetermined threshold comprises 10% of an average peak value of the AC voltage $\bar{E}$.

9. The method of claim 7, wherein the first predetermined threshold comprises 3% of an average peak value of the AC voltage $\bar{E}$.

10. The method of claim 7, wherein the second predetermined threshold comprises 10 degrees.

11. The method of claim 7, wherein the second predetermined threshold comprises 3 degrees.

12. The method of claim 7, wherein the supply bus receives the AC voltage $\bar{E}$ from a utility supply.

13. An interface switch comprising:
an internal terminal configured to connect to an internal power bus bearing an AC voltage $\bar{V}$;
an external terminal configured to connect to an external power bus bearing an AC voltage $\bar{E}$;
a controllable electrical switch between the internal terminal and the external terminal, the controllable electrical switch having an open condition wherein the internal terminal is electrically isolated from the external terminal and a closed condition wherein the internal terminal is electrically connected to the external terminal; and
a switch controller configured to control the controllable electrical switch by placing the controllable electrical switch into the open condition or the closed condition, wherein the switch controller is configured to determine a voltage difference between the AC voltage $\bar{E}$ and the AC voltage $\bar{V}$ and a relative phase angle $\delta_{EV}$ between the AC voltage $\bar{E}$ and the AC voltage $\bar{V}$, and further wherein the switch controller is configured to close the controllable electrical switch upon detection that the voltage difference is less than a first predetermined threshold, the relative phase angle $\delta_{EV}$ is less than a second predetermined threshold, and the AC voltage $\bar{E}$ leads the AC voltage $\bar{V}$ such that electrical power is imported to the internal bus from the external bus through the controllable electrical switch.

14. The interface switch of claim 13, wherein the switch controller is further configured to close the controllable electrical switch when the AC voltage $\bar{E}$ leads the AC voltage $\bar{V}$ and $\omega \geq \omega_0$, wherein $\omega$ is a selectable frequency of the AC voltage $\bar{V}$ and $\omega_0$ is a frequency of the AC voltage $\bar{E}$.

15. The interface switch of claim 13, wherein the first predetermined threshold comprises 10% of an average peak value of $\bar{E}$.

16. The interface switch of claim 13, wherein the second predetermined threshold comprises 10 degrees.

17. The interface switch of claim 13, wherein the AC voltage $\bar{E}$ is supplied by a utility supply, and wherein the AC voltage $\bar{V}$ is supplied by a microsource.

18. A method of operating an interface switch in a microgrid, the method comprising:
receiving an AC voltage $\bar{V}$ at an internal terminal of the interface switch from an internal bus, wherein the internal terminal is electrically connected to the internal bus, and further wherein an external terminal of the interface switch is electrically connected to an external bus bearing an AC voltage $\bar{E}$;
determining an envelope of a waveform corresponding to a voltage difference between the AC voltage $\bar{E}$ and the AC voltage $\bar{V}$ while the interface switch is in an open position; and
closing the interface switch at or just after a time when the envelope of the waveform of the voltage difference between the AC voltage $\bar{E}$ and the AC voltage $\bar{V}$ reaches a local minimum at a point of inflection.

19. The method of claim 18, wherein the AC voltage $\bar{E}$ is supplied directly or indirectly by a utility supply.

20. The method of claim 19, wherein the AC voltage $\bar{E}$ has a frequency of 60 Hz.

21. The method of claim 18, wherein the AC voltage $\bar{V}$ is supplied directly or indirectly by a microsource.

22. An interface switch comprising:
an internal terminal configured to connect to an internal power bus bearing an AC voltage $\bar{V}$ at a selectable frequency $\omega$;
an external terminal configured to connect to an external power bus bearing an AC voltage $\bar{E}$ at a frequency $\omega_0$;
a controllable electrical switch between the internal terminal and the external terminal, the controllable electrical switch having an open condition wherein the internal terminal is electrically isolated from the external terminal and a closed condition wherein the internal terminal is electrically connected to the external terminal; and
a switch controller configured to control the controllable electrical switch by placing the electrical switch into the open condition or the closed condition, wherein the switch controller is configured to identify an envelope of a waveform corresponding to a difference between the AC voltage $\bar{E}$ and the AC voltage $\bar{V}$, and further wherein the switch controller is configured to close the controllable electrical switch at or just after a time when the envelope of the waveform of the voltage difference between the AC voltage $\bar{E}$ and the AC voltage $\bar{V}$ reaches a local minimum at a point of inflection.

23. The interface switch of claim 22, wherein the AC voltage $\bar{E}$ is supplied directly or indirectly by a utility supply.

24. The interface switch of claim 23, wherein $\omega_0$ is 60 Hz.

25. The interface switch of claim 22, wherein the the AC voltage $\bar{V}$ is supplied directly or indirectly by a microsource.

* * * * *